United States Patent [19]

Markusch et al.

[11] Patent Number: 4,742,095
[45] Date of Patent: May 3, 1988

[54] CONTINUOUS PROCESS FOR THE PRODUCTION OF AQUEOUS POLYURETHANE-UREA DISPERSIONS

[75] Inventors: Peter H. Markusch, McMurray, Pa.; Arthur W. Mason, Sistersville, W. Va.; Wolfgang D. Wenzel, Berg-Gladbach, Fed. Rep. of Germany

[73] Assignee: Mobay Corporation, Pittsburgh, Pa.

[21] Appl. No.: 914,908

[22] Filed: Oct. 21, 1986

Related U.S. Application Data

[63] Continuation-in-part of Ser. No. 758,925, Jul. 25, 1985, abandoned.

[51] Int. Cl.[4] .............................................. C08G 18/10
[52] U.S. Cl. .................................... 523/322; 523/323; 524/839; 524/840
[58] Field of Search ................. 523/322, 323; 524/839, 524/840

[56] References Cited

U.S. PATENT DOCUMENTS

| | | | |
|---|---|---|---|
| 3,479,310 | 11/1969 | Dieterich et al. | 260/29.2 |
| 3,870,684 | 3/1975 | Witt et al. | 260/75 |
| 4,042,537 | 8/1977 | Dahm et al. | 260/2.5 AP |
| 4,066,591 | 1/1978 | Scriven et al. | 260/29.2 |
| 4,089,835 | 5/1978 | König et al. | 260/31.6 |
| 4,092,286 | 5/1978 | Noll et al. | 260/29.2 |
| 4,108,814 | 8/1978 | Reiff et al. | 260/29.2 |
| 4,203,883 | 5/1980 | Hangauer | 260/29.2 |
| 4,237,264 | 12/1980 | Noll | 260/29.2 |
| 4,238,378 | 12/1980 | Markusch | 260/29.2 |
| 4,408,008 | 10/1983 | Markusch | 524/591 |

FOREIGN PATENT DOCUMENTS

| | | |
|---|---|---|
| 2347299 | 4/1975 | Fed. Rep. of Germany . |
| 1414930 | 11/1975 | United Kingdom . |
| 1428907 | 3/1976 | United Kingdom . |
| 1432112 | 4/1976 | United Kingdom . |

*Primary Examiner*—C. Warren Ivy
*Attorney, Agent, or Firm*—Gene Harsh; Joseph C. Gil; Thomas W. Roy

[57] ABSTRACT

The present invention is directed to a continuous process for the production of aqueous polyurethane-urea dispersions by (a) mixing an emulsifiable isocyanate-terminated prepolymer with an aqueous medium in a low shear, stator-rotor dynamic mixer operating at a speed of about 500 to 8000 rpm utilizing a mixing wattage of about 0.3 to 10.0 watts/cubic centimeter and a mixing volume of at least about 0.1 liters, the average residence time of the aqueous medium and the prepolymer being about 1 to 30 seconds and the overall flow rate through the dynamic mixer being at least about 50 kg/h and (b) reacting the dispersed isocyanate-terminated prepolymer prepared in (a) with a polyamine chain extender to form an aqueous polyurethane-urea dispersion.

10 Claims, 1 Drawing Sheet

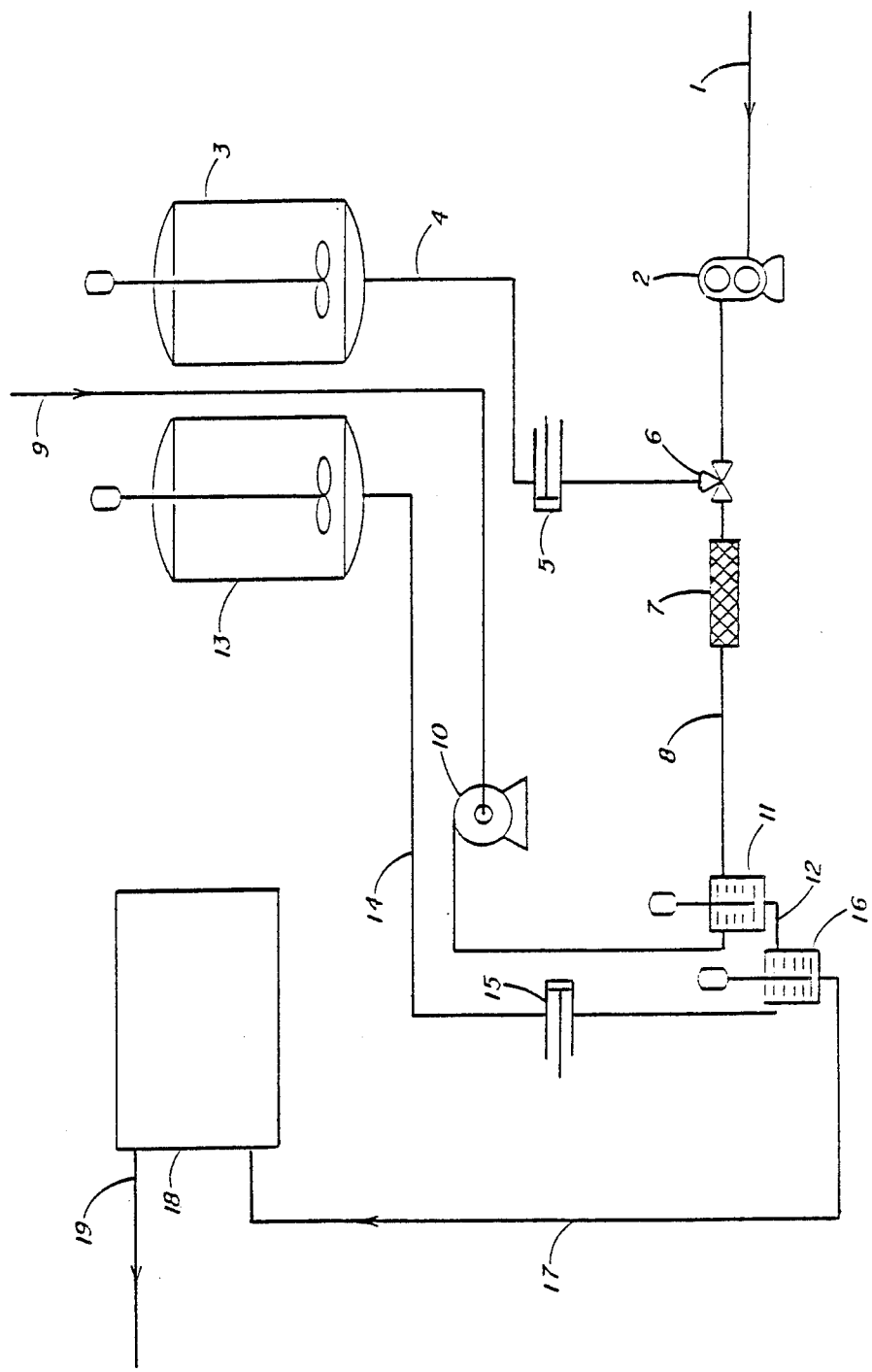

CONTINUOUS PROCESS FOR THE PRODUCTION OF AQUEOUS POLYURETHANE-UREA DISPERSIONS

CROSS REFERENCE TO RELATED APPLICATION

The present application is a continuation-in-part of U.S. application Ser. No. 758,925 filed on July 25, 1985 now abandoned.

BACKGROUND OF THE INVENTION

1. Field of the Invention

The present invention is directed to a continuous process for the production of stable, aqueous dispersions of polyurethane-ureas using low shear mixers.

2. Description of the Prior Art

The production of aqueous polyurethane-urea dispersions is known as shown by U.S. Pat. Nos. 3,479,310; 4,066,591; 4,092,286; 4,108,814; 4,237,264; and 4,238,378 which disclose linear polyurethane-ureas and U.S. Pat. Nos. 3,870,684; 4,203,883; and 4,408,008 which disclose cross-linked polyurethane-ureas. In general, the dispersions prepared in accordance with these patents are prepared by a batch process wherein an isocyanate-terminated prepolymer is formed in one reaction vessel, is dispersed in water in the same or a different reaction vessel and is finally chain-extended to form the aqueous polyurethane-urea dispersion.

One of the difficulties with the batch process is that the large reaction vessels required for commercial production require powerful stirring means to both disperse the isocyanate-terminated prepolymer and to chain extend the dispersed prepolymer. In addition, the more rapid rate of the reaction between aromatic isocyanate groups and water makes it extremely difficult to prepare aqueous polyurethane-urea dispersions from prepolymers containing aromatically-bound, terminal isocyanate groups. Further, the properties of the dispersions vary from batch to batch because of the complexity of the chemical reactions taking place, sometimes even resulting in products which are not usable. Finally, it is often difficult to scale up a particular dispersion from a laboratory scale to a commercial scale and still maintain the properties and appearance of the product as produced on the smaller scale.

Continuous processes for the production of aqueous polyurethane-urea dispersions are known as shown by British Pat. Nos. 1,414,930; 1,432,112; and 1,428,907 and German Offenlegungsschrift No. 2,347,299. However, these processes are dependent upon the use of high shear mixers requiring large amounts of energy for their operation. In addition, the shearing forces necessary for dispersing and chain-extending the prepolymer have a detrimental effect on the properties of the dispersion.

Accordingly, it is an object of the present invention to provide a continuous process for the preparation of aqueous polyurethane-urea dispersions having properties and an appearance which are consistently reproducible. It is an additional object of the present invention to provide a continuous process which does not have the large power requirements of the known batch processes or high shear processes. It is a further object of the present invention to provide a continuous process for production of aqueous polyurethane-urea dispersions which is easy to scale up from laboratory scale to pilot plant scale and, ultimately, to commercial size production. It is a final object to provide a simple process wherein aromatic diisocyanates may be used without substantial reaction of the aromatic isocyanate groups with water.

These objects may be achieved according to the present invention by using special low shear mixers as hereinafter described.

SUMMARY OF THE INVENTION

The present invention is directed to a continuous process for the production of aqueous polyurethane-urea dispersions by (a) mixing an emulsifiable isocyanate-terminated prepolymer with an aqueous medium in a low shear, stator-rotor dynamic mixer operating at a speed of about 500 to 8000 rpm utilizing a mixing wattage of about 0.3 to 10.0 watts/cubic centimeter and a mixing volume of at least about 0.1 liters, the average residence time of the aqueous medium and the prepolymer being about 1 to 30 seconds and the overall flow rate through the dynamic mixer being at least about 50 kg/h and (b) reacting the dispersed isocyanate-terminated prepolymer prepared in (a) with a polyamine chain extender to form an aqueous polyurethane-urea dispersion.

BRIEF DESCRIPTION OF DRAWING

The drawing illustrates a preferred flow diagram for conducting the process according to the present invention.

DETAILED DESCRIPTION OF THE INVENTION

The present invention is directed to a continuous process for the production of aqueous polyurethane-urea dispersions by (a) mixing an emulsifiable isocyanate-terminated prepolymer with an aqueous medium in a low shear, stator-rotor dynamic mixer operating at a speed of about 500 to 8000, preferably about 2000 to 6000 rpm and having a mixing wattage of about 0.3 to 10.0, preferably 0.5 to less than 5.0, most preferably about 1.0 to 4.0 watts/cc and a mixing volume of at least about 0.1, preferably about 0.1 to 5.0, most preferably about 0.5 to 2.5 liters, the average residence time in the dynamic mixer being about 1 to 30, preferably about 2 to 20, most preferably about 5 to 10 seconds and the overall flow rate through the dynamic mixer being at least about 50, preferably about 50 to 5000, most preferably 60 to 2500 kg/h, wherein said mixers, when arranged vertically, have levels of horizontal pins arranged in sets of at one level of rotor pins and at least one level of stator pins such that the distance between said levels of pins is about 2 to 50, preferably about 3 to 25, most preferably about 4 to 10 mm, and (b) reacting the dispersed isocyanate-terminated prepolymer prepared in (a) with a polyamine chain extender to form an aqueous polyurethane-urea dispersion, preferably in a second dynamic mixer.

In accordance with the present invention an isocyanate-terminated prepolymer which has been rendered hydrophilic by the chemical incorporation of ionic or non-ionic hydrophilic groups or by mixing with external emulsifiers is dispersed in an aqueous medium such as water in a low-energy, relatively uncomplicated dynamic mixer which operates on the stator-rotor principle. Afterwards, the dispersed, isocyanate-terminated prepolymer is subsequently mixed and reacted with an amine chain extender in a second mixing operation, preferably using the same type of mixer as was used in the prepolymer dispersion step. The chain extension reaction is then allowed to proceed in a final stirred reactor.

Surprisingly, these dynamic mixers are very efficient for continuously producing aqueous polyurethane-urea dispersions even though the prior art requires high shear mixers and considerably greater amounts of power in order to continuously produce this type of product. However, the dynamic mixers of the present invention are sufficient to produce dispersions whose properties are consistently obtained within predetermined specifications.

One of the reasons for being able to obtain reproducible dispersions is the short residence time necessary for dispersing the isocyanate-terminated prepolymer in the aqueous medium. Most commercial dispersions are prepared in a batch process by incrementally introducing the isocyanate-terminated prepolymer into a reaction vessel containing the necessary water for dispersion. The amount of time from the initial introduction of the prepolymer into water until all of the prepolymer is dispersed is quite long when compared to the short residence times obtainable in accordance with the process of the present invention. Since the terminal isocyanate groups of the prepolymer immediately begin to react with the water during the dispersion step, the relatively long period of time needed to disperse the prepolymers according to the commercially known batch process is quite disadvantageous.

First, the amount of prepolymer which reacts with water prior to addition of the chain extender varies in accordance with the known batch process, thus, making it difficult to determine the precise amount of chain extender which is necessary. Accordingly, the properties of dispersions prepared from the known batch process vary from run to run. These variances occur even though the commercial batch processes use the least reactive diisocyanates available in preparing the prepolymers. Accordingly, even though all steps are taken to produce dispersions having properties which are as consistent as possible, the prior art batch process is not sufficient to achieve this goal. Further, the ability to reduce or substantially eliminate the reaction between the terminal isocyanate groups and water is even more critical when preparing cross-linked dispersions since the presence of excess polyamine chain extender (due to a reduced amount of isocyanate groups because of their reaction with water) will vary the amount of cross-linking obtained in the final product.

Further, the use of the much less expensive aromatic diisocyanates is not possible in the conventional batch process because of the high reactivity of aromatic diisocyanates with water. Therefore, the aromatic diisocyanates are substantially chain extended during the dispersion step so that subsequent chain extension with amines is difficult to consistently control due to the constantly changing isocyanate content. Accordingly, the use of aromatic diisocyanates requires additional process steps such as the blocking of the isocyanate groups. However, because of the short residence times obtainable with the dynamic mixers of the present invention, aromatic diisocyanates may be readily processed and chain extended to produce aqueous polyurethane-urea dispersions whose properties and appearance are consistently reproducible.

The drawing illustrates a preferred embodiment for conducting the process according to the present invention. An unneutralized, isocyanate-terminated prepolymer is delivered to valve 6 by pump 2 which may be any suitable pump such as a gear pump. Neutralizer from tank 3 is delivered through stream 4 via pump 5 to valve 6 where it is blended with prepolymer 1. Pump 5 should be of a type which can be accurately controlled such as a piston pump so that the necessary amount of neutralizing agent can be added to the prepolymer in order to convert the potential ionic groups of the prepolymer into neutralized hydrophilic ionic groups. It is also possible to add an organic solvent with the neutralizer or to add just solvent when the prepolymer has been preneutralized or does not contain potential ionic groups. From mixer 6 the stream flows into static mixer 7 where the neutralizing agent or solvent is mixed with the prepolymer. The prepolymer then flows via stream 8 into dynamic mixer 11 where it is mixed and dispersed in water from stream 9 via pump 10 which may be a centrifugal pump. The dispersed prepolymer leaves dynamic mixer 11 via stream 12 and flows into a second dynamic mixer 16 where it is mixed with the amine chain extender from tank 13 through stream 14 via pump 15 which should also be a pump which can be accurately metered such as a piston pump to accurately control the amount of chain extender. The isocyanate-terminated prepolymer of stream 12 is chain extended in dynamic mixer 16 and then flows through stream 17 to analytical control 18. At this point the particle size and pH of the aqueous polyurethane-urea dispersion may be measured and used to control the amount of neutralizing agent and chain extender. After passing through analytical control 18 the prepolymer is delivered to a stirred reaction vessel for completion of the chain extension reaction. The different pumps may also be replaced by other metering devices such as mass controlled valves.

The dynamic mixers operate on the stator-rotor principle. While the mixer does not have to be arranged vertically and may be arranged either horizontally or at other angles, it will be assumed for the purposes of the following discussion that the dynamic mixer is in a vertical position, i.e. such that the rotor is vertical. The dynamic mixer contains levels of horizontal pins connected to the stator and rotor, i.e. the pins are perpendicular to the stator and rotor. The levels of pins are vertically spaced in sets of at least one level of stator pins and at least one level of rotor pins such that the distance between the levels of pins within each set is about 2 to 50 mm, preferably about 3 to 25 mm and most preferably about 4 to 10 mm. The pins are preferably arranged such that both of the adjacent levels of pins to any one level of pins within are this spacing. Most preferably, all of the levels of pins are spaced the same distance apart. In accordance with the present invention, with respect to a level of stator pins, "adjacent" refers to the next level of rotor pins above and below the level of stator pins. In other words, stator pins are "adjacent" to rotor pins and rotor pins are "adjacent" to of stator pins. Each level of pins may have several pins; however, generally four pins spaced equidistantly around the stator or rotor are sufficient to ensure proper mixing.

The number of levels of pins and their order of attachment to the stator and rotor may vary, provided that they provide sufficient mixing for the dispersing step and, optionally the chain extension step. The chain extension step may also be conducted using a static mixer or other suitable mixer, but preferably a dynamic mixer is also used for the chain extension step. One method of arranging the levels of pins is to have several sets of stator and rotor pins placed such that the vertical spacing between the levels of stator and rotor pins in each set is within the disclosed ranges, but where the vertical spacing between each set of pins is outside the disclosed ranges. Such an arrangement of mixing pins does not provide very efficient mixing and might require a longer mixer or greater residence time to provide sufficient mixing, but is still feasible, though not preferred. A more efficient arrangement for the levels of pins is to have sets of three or more levels of pins, wherein the vertical spacing between the levels of stator and rotor pins in each set is within the disclosed ranges, while the vertical spacing between the various sets is outside the disclosed vertical spacing. This method of pin arrangement provides more efficient mixing than the method discussed previously. The most preferred method for the arrangement of the pins is for each level of mixing pins to be vertically spaced within the disclosed spacing, most preferably equidistant, from both adjacent levels of mixing pins. In other words, the spacing between a level of stator pins and both adjacent levels of rotor pins is within the disclosed spacing, preferably the same distance and the spacing between a level of rotor pins and both adjacent levels of stator pins is within the disclosed spacing, preferably the same distance. Generally, five levels of pins are sufficient to ensure proper mixing. However, the number of pins on each level and the number of levels of pins necessary for efficient mixing depends upon the length and diameter of the dynamic mixers and the flow rate required.

The dynamic mixers generally have a volume which is at least about 0.1 liters and may be as high as 50 liters, although dynamic mixtures having a volume of about 0.1 to 5.0 liters are preferred and those having volumes of about 0.5 to 2.5 liters are especially preferred. While dynamic mixers having volumes in excess of 25 liters are commercially available (e.g. from Draiswerke GmbH of Mannheim-Waldhof, West Germany) and may be used for the continuous preparation of aqueous polyurethane-urea dispersions, there are several advantages for using smaller dynamic mixers. Because of the throughputs obtainable with dynamic mixers, it is possible to produce large quantities of products per time using dynamic mixers which are less than 2.5 liters in size. When producing even greater quantities of product per time on the larger dynamic mixers, tremendous amounts of product are produced before any adjustments can be made to the system. For instance, if the particle size of the dispersion is too large necessitating an increase in the amount of neutralizing agent, much less material is wasted in a small dynamic mixer before the system can be adjusted than when using one of the larger dynamic mixers. Accordingly, even though it is possible to use the larger dynamic mixers, they are not preferred.

The flow rates which may be achieved using the larger dynamic mixers may be as high as 50,000–100,000 kg/h, even though these flow rates may not be feasible for other reasons. When using dynamic mixers within the preferred range of about 0.1 to 5 liters, the overall flow rate (total amount of materials entering or leaving the system) generally does not exceed about 5000 kg/h.

Even though it has been disclosed that a second dynamic mixer may be used for the chain extension step, it is also within the scope of the present invention to combine the two dynamic mixers into one larger dynamic mixer wherein the chain extender is added after sufficient mixing has taken place for the prepolymer to be dispersed in water.

In preparing the aqueous polyurethane-urea dispersions of the present invention, any of the reactants known from polyurethane chemistry may be used. These components are set forth hereinafter.

The aqueous polyurethane-urea dispersions are prepared by a two-stage process wherein an isocyanate-terminated prepolymer is formed in the first stage by reacting an excess of a polyisocyanate with an isocyanate-reactive component as discussed in more detail hereinafter. The isocyanate-terminated prepolymer is then dispersed in water and chain extended in a second stage to form the polyurethane-urea.

Examples of suitable polyisocyanates to be used in preparing the isocyanate-terminated prepolymers in accordance with the present invention are organic diisocyanates represented by the general formula $$R(NCO)_2$$

in which R represents an organic group obtainable by removal of the isocyanate groups from an organic diisocyanate having a molecular weight of from about 112 to 1,000, and preferably from about 140 to 400. Diisocyanates preferred for the process according to the invention are those represented by the general formula indicated above in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6–15 carbon atoms. Examples of the organic diisocyanates which are particularly suitable for the process include tetramethylene diisocyanate, 1,6-hexamethylene diisocyanate, dodecamethylene diisocyanate, cyclohexane-1,3- and -1,4-diisocyanate, 1-isocyanato-3-isocyanatomethyl-3,5,5-trimethylcyclohexane (isophorone diisocyanate or IPDI), bis-(4-isocyanatocyclohexyl)-methane, 1,3- and 1,4-bis(isocyanatomethyl)-cyclohexane, bis-(4-isocyanato-3-methyl-cyclohexyl)-methane, 2,4-diisocyanatotoluene, 2,6-diisocyanatotoluene, mixtures of these isomers, 4,4'-diisocyanato diphenyl methane and its isomeric mixtures with 2,4'- and optionally 2,2'-diisocyanato diphenylmethane, and 1,5-diisocyanato naphthalene. Mixtures of diisocyanates can, of course, be used. Preferred diisocyanates are 1,6-hexamethylene diisocyanate, isophorone diisocyanate, bis-(4-isocyanatocyclohexyl)-methane, 2,4- and/or 2,6-diisocyanatotoluene and 4,4'- and/or 2,4'-diisocyanato diphenylmethane.

The organic compounds containing at least two isocyanate-reactive groups which are reacted with the previously described organic diisocyanates to prepare the isocyanate-terminated prepolymers can be divided into two groups, i.e., high molecular weight compounds with molecular weights from 400 to about 6,000, preferably from 800 to about 3,000, and low molecular weight compounds with molecular weights below 400. Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred.

Suitable polyester polyols include reaction products of dihydric alcohols and dibasic carboxylic acids. Instead of free dicarboxylic acids, the corresponding dicarboxylic acid anhydrides or dicarboxylic acid esters of lower alcohols or mixtures thereof may be used for preparing the polyesters. The dicarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid: trimellitic acid: phthalic anhydride: tetrahydrophthalic anhydride; endomethylene tetrahydroxyphthalic anhydride; glutaric anhydride; maleic acid; maleic anhydride; fumaric acid; dimeric fatty acids such as oleic acid: dimethyl terephthalates and bis-glycol terephthalate. Suitable dihydric alcohols include, e.g. ethylene glycol: propylene glycol-(1,2) and -(1,3): butylene glycol-(1,4) and -(1,3): hexanediol-(1,6): octanediol-(1,8): neopentyl glycol; cyclohexanedimethanol (1,4-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol. The polyesters may also contain a portion of carboxyl end groups. Polyesters of lactones, e.g. ε-caprolactone or hydroxcarboxylic acids, e.g. α-hydroxycaproic acid, may also be used.

Polycarbonates containing hydroxy groups include those known per se such as the products obtained from the reaction of diols such as propanediol-(1,3), butanediol-(1,4) and/or hexanediol-(1,6), diethylene glycol, triethylene glycol or tetraethylene glycol with diarylcarbonates, e.g. diphenylcarbonate or phosgene.

Suitable polyether polyols are obtained in known manner by the reaction of starting compounds which contain reactive hydrogen atoms with alkylene oxides such as ethylene oxide; propylene oxide; butylene oxide; styrene oxide; tetrahydrofuran or epichlorohydrin or with mixtures of these alkylene oxides. It is preferred that the polyethers do not contain more than about 10% by weight of ethylene oxide units. Most preferably, polyethers obtained without the addition of ethylene oxide are used.

Suitable starting compounds containing reactive hydrogen atoms include, e.g. water and the dihydric alcohols set forth for preparing the polyester polyols.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Pat. No. 1,152,536).

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythio-mixed ethers, polythioether esters or polythioether ester amides, depending on the co-components.

Suitable polyacetals include the compounds which can be prepared from aldehydes, e.g. formaldehyde, and glycols such as diethylene glycol, triethylene glycol, ethoxylated 4,4'-dihydroxy-diphenyldimethylmethane, and hexanediol-(1,6). Polyacetals suitable for the purpose of the invention may also be prepared by the polymerization of cyclic acetals.

Suitable polyhydroxy polyester amides and polyamines are, for example, the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxyfunctional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

The compositions may also contain a low molecular weight isocyanate-reactive component having an average molecular weight of up to 400. The low molecular weight compounds which may optionally be used in combination with the high molecular weight isocyanate-reactive compounds for the preparation of the isocyanate-terminated prepolymers include, for example, the dihydric alcohols which have been described for the preparation of the polyester polyols: diamines such as diaminoethane, 1,6-diaminohexane, piperazine, 2,5-dimethylpiperazine, 1-amino-3-amino-methyl-3,5,5-trimethylcyclohexane (isophorone diamine or IPDA), bis-(4-aminocyclohexyl)-methane, bis-(4-amino-3-methylcyclohexyl)-methane, 1,4-diaminocyclohexane and 1,2-propylene-diamine, hydrazine, amino acid hydrazides, hydrazides of semi-carbizidocarboxylic acids, bis-hydrazides and bis-semi-carbazides; and the like. The dihydric alcohols are the preferred low molecular weight isocyanate-reactive component for preparing the isocyanate-terminated prepolymers.

In addition to the above-mentioned components which are preferably difunctional in the isocyanate polyaddition reaction, monofunctional and even small proportions of trifunctional and higher functional components generally known in polyurethane chemistry, such as trimethylolpropane, may be used in special cases in which slight branching of the isocyanate-terminated prepolymer is desired. However, these prepolymers should be substantially linear and this may be achieved by maintaining the average functionality of the prepolymer starting components below about 2.1.

In order to enable the polyurethane-urea to be stably dispersed in an aqueous medium, either ionic or potential ionic groups or lateral or terminal, hydrophilic ethylene oxide units are chemically incorporated into the polyurethane-urea. The ionic or potential ionic groups are incorporated in an amount sufficient to provide an ionic group content of up to about 120 milliequivalents, preferably about 10 to 80 milliequivalents, more preferably about 10 to 60 milliequivalents and most preferably about 10 to 30 milliequivalents per 100 g of polyurethane-urea. The content of hydrophilic ethylene oxide units may be up to about 10%, preferably up to about 8%, more preferably about 1 to 6% and most preferably about 2 to 6%, by weight, based on the weight of the polyurethane-urea. In addition, up to about 75% of the allowable, chemically incorporated, hydrophilic ethylene oxide units may be replaced by the known nonionic, external emulsifiers such as those of the alkaryl type such as polyoxyethylene nonyl phenyl ether or polyoxyethylene octyl phenyl ether; those of the alkyl ether type such as polyoxyethylene laurate, polyoxyethylene oleate or polyoxyethylene stearate; and those of the polyoxyethylene benzylated phenyl ether type.

The ionic or potential ionic groups may be chemically incorporated into the isocyanate-terminated prepolymer and optionally a portion of these groups may be chemically incorporated through the chain extender which is used to form the polyurethane-urea from the prepolymer. However, in accordance with the process of the present invention the prepolymer must be dispersible in water prior to the incorporation of ionic groups via the chain extender. Therefore, the incorporation of a portion of the ionic groups via the chain extender is less preferred.

Suitable compounds for incorporating these groups include (i) monoisocyanates or diisocyanates which contain ionic or potential ionic groups and (ii) compounds which are monofunctional or difunctional in the isocyanate-polyaddition reaction and contain ionic or potential ionic groups.

The potential ionic groups or their corresponding ionic groups may be cationic or anionic, although the anionic groups are preferred. Examples of anionic groups include $-COO^{\ominus}$ and $-SO_3^{\ominus}$. Examples of cationic groups are

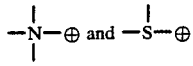

These ionic groups are formed by neutralizing the corresponding potential ionic groups either prior to, during or after forming the isocyanate-terminated prepolymer. When the potential ionic groups are neutralized prior to forming the isocyanate-terminated prepolymer, the ionic groups are incorporated directly. When neutralization is preformed subsequent to forming the prepolymer, potential ionic groups are incorporated.

Suitable compounds for incorporating the previously discussed carboxylate, sulfonate and quaternary nitrogen groups are described in U.S. Pat. Nos. 3,479,310, 4,303,774 and 4,108,814, the disclosures of which are herein incorporated by reference. Suitable compounds for incorporating tertiary sulfonium groups are described in U.S. Pat. No. 3,419,533, also incorporated by reference. The neutralizing agents for converting the potential ionic groups to ionic groups are also described in the above-mentioned U.S. patents. Within the context of this invention, the term "neutralizing agents" is mean to embrace all types of agents which are useful for converting potential ionic groups to ionic groups. Accordingly, this term also embraces quaternizing agents and alkylating agents.

The preferred sulfonate groups for incorporation into the isocyanate-terminated prepolymers are the diol sulfonates disclosed in U.S. Pat. No. 4,108,814.

The preferred carboxylate groups for incorporation into the isocyanate-terminated prepolymer are derived from hydroxy-carboxylic acids of the general formula $$(HO)_xQ(COOH)_y$$

wherein

Q represents a straight or branched, hydrocarbon radical containing 1 to 12 carbon atoms, and x and y represents values from 1 to 3.

Examples of these hydroxy-carboxylic acids include citric acid and tartaric acid.

The preferred acids are those of the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula:

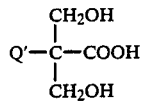

wherein Q' is hydrogen or an alkyl group containing 1 to 8 carbon atoms. The most preferred compound is α,α-dimethylol propanol propionic acid, i.e. when Q' is methyl in the above formula.

Suitable compounds for incorporating the lateral or terminal, hydrophilic ethylene oxide units may be either monofunctional or difunctional in the context of the isocyanate-polyaddition reaction and include (i) diisocyanates which contain lateral, hydrophilic ethylene oxide units, (ii) compounds which are difunctional in the isocyanate-polyaddition reaction and contain lateral, hydrophilic ethylene oxide units, (iii) monoisocyanates which contain terminal, hydrophilic ethylene oxide units, (iv) compounds which are monofunctional in the isocyanate-polyaddition reaction and contain terminal, hydrophilic ethylene oxide units, and (v) mixtures thereof.

The preferred difunctional hydrophilic components having lateral hydrophilic chains containing ethylene oxide units include compounds corresponding to the following general formula:

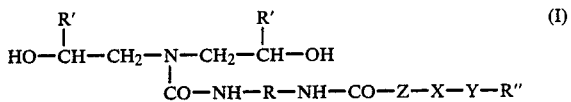

and/or compounds corresponding to the following general formula:

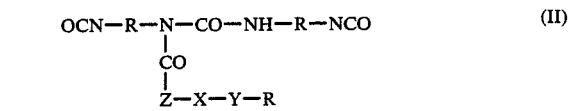

Preferred difunctional hydrophilic components are those corresponding to general formula (I) above.

In general formulae (I) and (II) above,

R represents a difunctional radical of the type obtained by removing the isocyanate groups from a diisocyanate corresponding to the general formula:

R(NCO)₂ of the above-mentioned type;

R' represents hydrogen or a monovalent hydrocarbon radical containing from 1 to 8 carbon atoms, preferably a hydrogen atom or a methyl group;

R" represents a monovalent hydrocarbon radical having from 1 to 12 carbon atoms, preferably an unsubstituted alkyl radical having from 1 to 4 carbon atoms;

X represents the radical obtained by removal of the terminal hydroxyl group from a polyalkylene oxide chain having from about 5 to 90 chain members, preferably from about 20 to 70 chain members, of which at least about 40%, preferably at least about 65%, comprises ethylene oxide units and the remainder comprises other alkylene oxides such as propylene oxide, butylene oxide or styrene oxide units, preferably propylene oxide units;

Y represents oxygen or —NR'''- wherein R''' has the same definition as R''; and

Z represents a radical which corresponds to Y, but may additionally represent —NH—.

The compounds corresponding to general formulae (I) and (II) above may be produced by the methods according to U.S. Pat. Nos. 3,905,929 and 3,920,598 (the disclosures of which are herein incorporated by reference). In addition to the disclosures of these two patents, it is noted that instead of using the monofunctional polyether alcohols mentioned therein as starting materials, it is also possible to use those of the type where the polyether segment, in addition to ethylene oxide units, also contains up to 60%, preferably up to 35%, by weight based on polyether segment, of other alkylene oxide units such as propylene oxide, butylene oxide or styrene oxide units, preferably propylene oxide units. The presence of such "mixed polyether segments" may afford specific advantages in certain cases. These "mixed polyether segments" are described in U.S. Pat. No. 4,190,566, the disclosure of which is herein incorporated by reference.

Other particularly preferred hydrophilic components for incorporating lateral or terminal hydrophilic chains containing ethylene oxide units include compounds corresponding to the following general formula:

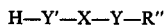

H—Y'—X—Y—R'' and/or compounds corresponding to the following general formula:

OCN—R—NH—CO—Z—X—Y—R'' wherein X, Y, Z, R and R'' are as defined above; and Y' corresponds in its meaning to Y, but may additionally represent —NH—.

Monofunctional polyethers are preferably used, but preferably only in molar quantities of ≦10%, based on the polyisocyanate used, to guarantee the required high molecular weight structure of the polyurethane-urea. In cases where relatively large molar quantities of monofunctional alkylene oxide polyethers are used, it is advantageous also to use trifunctional compounds containing isocyanate-reactive hydrogen atoms, although the average functionality of the polymer starting components should preferably not exceed about 2.1 in order to obtain substantially linear prepolymers.

The monofunctional hydrophilic components are produced in accordance with the processes described in U.S. Pat. Nos. 3,905,929 and 3,920,598 by alkoxylating of a monofunctional starter, such as n-butanol, using ethylene oxide and optionally another alkylene oxide, for example propylene oxide. The resultant product may be optionally further modified (although this is less preferred) by reaction with excess quantities of diisocyanates or by reaction with ammonia to form the corresponding primary amino-polyethers.

The isocyanate-terminated prepolymers of the present invention are prepared by reacting the polyisocyanate component with the high molecular weight organic component containing at least 2 isocyanate-reactive groups and the following optional components, i.e. the low molecular weight organic component containing at least 2 isocyanate-reactive groups, the component containing at least one ionic group or at least one potential anionic group and the component containing the hydrophilic ethylene oxide units. The potential ionic groups are groups which may be converted to ionic groups by treatment with neutralizing agents. The ratio of isocyanate groups to isocyanate-reactive groups is maintained between about 1.1 to 3, preferably about 1.2 to 2 and most preferably about 1.3 to 1.5 on an equivalent basis. The above components may be reacted simultaneously or sequentially to produce the isocyanate-terminated prepolymer. Simultaneous reaction will lead to the production of random copolymers, whereas a sequential-type reaction will lead to the production of block copolymers. The order of addition of the compounds containing isocyanate-reactive hydrogen(s) in the sequential-type reaction process is not critical; however, during the reaction of these compounds it is especially preferred to maintain an excess of isocyanate groups in order to control the molecular weight of the prepolymer and prevent high viscosities.

The reaction temperature during prepolymer production is normally maintained below about 150° C., preferably between about 50° and 130° C. The reaction is continued until the content of unreacted isocyanate groups decreases to the theoretical amount or slightly below. The finished prepolymer should have a free isocyanate content of about 1 to 8%, preferably about 1 to 5% by weight, based on the weight of prepolymer solids. It is possible to conduct the prepolymer reaction in the presence of catalysts known to accelerate the reaction between isocyanate groups and isocyanate-reactive groups, such as organo-tin compounds, tertiary amines, etc.; however, the use of a catalyst is generally not necessary and it is often preferred to conduct the reaction without a catalyst.

The prepolymers may be prepared in the presence of solvent provided that the solvent is substantially nonreactive in the context of the isocyanate-polyaddition reaction. The solvents are generally organic and may be comprised essentially of carbon and hydrogen with or without other elements such as oxygen or nitrogen. While it may not be necessary to employ a solvent during formation of the isocyanate-terminated prepolymer, the use of a solvent may be desirable to maintain the reactants in the liquid state as well as to permit better temperature control during the reaction by serving as a heat sink and, if desired, as a refluxing medium. Solvents which may be employed include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons, and the like, and mixtures thereof. The amount of solvent employed should be sufficient to provide a prepolymer solution having a sufficiently low viscosity to enhance the formation of the polyurethane-urea dispersion of this invention; however, the solutions may be successfully employed in forming the dispersions even though the viscosity of the solution is relatively high at the temperature of dispersion. Such viscosities may be as low as 100 centipoise or above 10,000 centipoise, e.g. as high as 50,000 centipoise, preferably 40,000 centipoise, and only mild agitation need be employed to form the dispersion, even in the absence of an external emulsifying agent. It is possible to use about 0.01 to 10 parts by weight of solvent, preferably about 0.02 to 2 parts by weight of solvent, per part by weight of the prepolymer. However, the presence of a solvent for the prepolymer or the polyurethane-urea is not necessary to provide a stable, aqueous dispersion. The solvent can be either removed from the PUR dispersion or retained in the dispersion. As discussed in the description of the drawing the solvent can be also added to the prepolymer together with or instead of the neutralizer. Because of the short residence time between prepolymer and solvent, OH-containing solvents such as alcohols may also be used. Isopropanol is preferred. The removal of the low boiling solvent is desirably conducted under conditions which are not deleterious to the polyurethane-urea such as by vacuum distillation. A solvent having a higher boiling point than water such as dimethyl formamide, N-methyl-2-pyrrolidinone, and the like may be employed, in which case, the higher boiling solvent is generally retained in the polyurethane-urea aqueous dispersion polymer to enhance the coalescence of the polyurethane-urea particles during film formation.

In order to convert the preferred potential anionic groups to anionic groups either before, during or after their incorporation into the prepolymers, either volatile or nonvolatile cations are used to form the counterions of the anionic groups. Volatile cations are those wherein at least about 90% of the basic organic compounds used to form the counterion of the anionic group volatilize under the conditions used to cure films formed from the polyurethane-urea dispersions, preferably at least about 90% of the basic organic compounds volatilize when films formed from the polyurethane-urea dispersions are cured under ambient conditions. Nonvolatile cations are those wherein at least about 90% of the cations do not volatilize under the conditions used to cure films formed from the polyurethane-urea dispersions, preferably at least about 90% of the cations do not volatilize when films formed from the polyurethane-urea dispersions are cured under ambient conditions. As the amount of counterions formed from volatile basic organic compounds increases, the resistance to water swell of coatings or films prepared from the aqueous polyurethane-urea dispersions is further improved; whereas, as the amount of counterions formed from nonvolatile cations increases, the hydrolytic stability of films or coatings prepared from the aqueous polyurethane-urea dispersions is further improved. Therefore, it is possible to control the properties of the finally produced coatings or films by simply controlling the ratio between the volatile and nonvolatile cations used to form the counterions of the anionic groups.

Suitable volatile basic organic compounds for neutralizing the potential anionic groups are the primary, secondary or tertiary amines. Of these the trialkyl-substituted tertiary amines are preferred. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone. The most preferred tertiary amines are those which do not contain active hydrogen(s) as determined by the Zerewitinoff test since they are capable of reacting with the isocyanate groups of the prepolymers which can cause gelation, the formation of insoluble particles or chain termination.

The more volatile tertiary amines are especially advantageous since the salts formed from these amines are capable of decomposing during film formation under ambient conditions with volatilization of the tertiary amine. Another advantage of these tertiary amines is that they do not take part in the isocyanate-polyaddition reaction. For example, when isocyanate-terminated prepolymers containing potential anionic groups are formed, it would be difficult to neutralize these groups prior to dispersion in water with primary or secondary amines due to the fact that these amines may react with the free isocyanate groups of the prepolymer. In this context, these amines act more like chain terminators or chain extenders than neutralizing agents, and make the subsequent high molecular weight build-up during the aqueous chain extension step more difficult and less predictable. Thus, if primary and secondary amines are used, they should preferably be used as neutralizing agents prior to the formation of the prepolymer, i.e., when the potential anionic groups are converted to anionic groups prior to their incorporation into the prepolymer. However, the tertiary amines are preferred even when neutralization is conducted in this manner.

Suitable nonvolatile cations include monovalent metals, preferably alkali metals, more preferably lithium, sodium and potassium and most preferably sodium. The cations may be used in the form of inorganic or organic salts, preferably salts wherein the anions do not remain in the dispersions such as hydrides, hydroxides, carbonates or bicarbonates.

When the potential cationic or anionic groups of the prepolymer are neutralized, they provide hydrophilicity to the prepolymer and better enable it to be stably dispersed in water. The potential or unneutralized ionic groups do not provide this degree of hydrophilicity. Accordingly, a sufficient amount of the potential ionic groups must be neutralized so that when combined with the optional hydrophilic ethylene oxide units and the optional external emulsifiers, the isocyanate-terminated prepolymer can be stably dispersed in water. Generally, at least about 75%, preferably at least about 90%, of the potential ionic groups are neutralized to the corresponding ionic groups. Larger amounts of potential ionic groups may remain unneutralized; however, there are no advantages to be gained from large quantities of unneutralized potential anionic groups and their presence could be detrimental by reducing the hydrolytic stability of films or coatings prepared from the dispersions obtained in accordance with the present invention. When smaller amounts of potential ionic groups are incorporated, it may be necessary to neutralize substantially all of these groups to obtain the desired amount of hydrophilicity. No firm guidelines can be given as to the amount of ionic groups needed, since the dispersibility of the polyurethane-urea depends on many factors including, but not limited to, the amount of hydrophilicity provided by the ethylene oxide units and external emulsifiers, the desired particle size and the application requirements.

The neutralization steps may be conducted (1) prior to prepolymer formation by treating the component containing the potential ionic group(s) or (2) after prepolymer formation, but prior to dispersing the prepolymer.

The reaction between the neutralizing agent and the potential anionic groups may be conducted between about 20° C. and 150° C., but is normally conducted at temperatures below about 100° C., preferably between about 30° and 80° C. and most preferably between about 50° and 70° C., with agitation of the reaction mixture.

In accordance with the process of the present invention, the isocyanate-terminated prepolymer is continuously dispersed in an aqueous medium such as water by using a low shear dynamic mixer. After the prepolymer has been dispersed, it is passed to a second mixer, preferably a second low shear dynamic mixer or even a static mixer wherein the prepolymer is chain extended to form the polyurethane-urea final product. For purposes of the present invention, water is included as an amine chain extender since it reacts with isocyanate groups to form ureas in a similar manner to amines. Accordingly, when water is used as the sole chain extender, there is no need to use a second dynamic mixer to add the chain extender to the dispersed prepolymer. In this special case the prepolymer may simply be conveyed to a stirred tank maintained at slightly elevated temperature in order to allow the prepolymer to complete its reaction with the dispersing water. If amines are used to chain extend the prepolymer, then a second mixer, preferably a low shear dynamic mixer is used to mix the amine chain extender with the dispersed prepolymer.

The aqueous polyurethane-urea dispersions of the present invention are formed by reacting the isocyanate-terminated prepolymers with a polyamine or a mixture of polyamines in accordance with the previously described process. The average functionality of the amine, i.e. the number of amine nitrogens per molecule, should be between about 2 and 6, preferably between about 2 and 4 and most preferably between about 2 and 3. The desired functionalities can be obtained by using mixtures of diamines and triamines. A functionality of 3.0 can be achieved either by using
(1) triamines,
(2) equimolar mixtures of diamines and tetramines
(3) mixtures of 1 and 2, or
(4) any other suitable mixtures.
These other suitable mixtures for obtaining the desired functionalities will be readily apparent to those of ordinary skill in the art.

Suitable amines are essentially hydrocarbon polyamines containing 2 to 6 amine groups which have isocyanate-reactive hydrogens according to the Zerewitinoff test, e.g., primary or secondary amino groups. the polyamines are generally aromatic, aliphatic or alicyclic amines and contain between about 1 to 30 carbon atoms, preferably about 2 to 15 carbon atoms. These polyamines may contain additional substituents provided that they are not as reactive with isocyanate groups as the primary or secondary amines. Examples of polyamines for use in the present invention include the amines listed as low molecular compounds containing at least two isocyanate-reactive amino hydrogens, and also diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazine, N,N,N'-tris-(2-aminoethyl)-ethylene diamine, N-[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)-amine, N,N-bis(2-piperazinoethyl)-amine, polyethylene amines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)-amine, N,N'-bis-(3-aminopropyl)-ethylene diamine and 2,4-bis-(4'-aminobenzyl)-aniline. Preferred polyamines are 1-amino-3-aminomethyl-3,5,5-trimethyl-cyclohexane (isophorone diamine or IPDA), bis-(4-aminocyclohexyl)-methane, bis-(4-amino-3-methyl-cyclohexyl)-methane, 1,6-diaminohexane, ethylene diamine, diethylene triamine, triethylene tetramine, tetraethylene pentamine, pentaethylene hexamine and hydrazine hydrate.

The amount of polyamine chain extender to be used in accordance with the present invention is dependent upon the number of terminal isocyanate groups in the prepolymer. Generally, the ratio of terminal isocyanate groups of the prepolymer to the amino hydrogens of the polyfunctional amine is between about 1.0:0.6 and 1.0:1.1, preferably between about 1.0:0.8 and 1.0:0.98 on an equivalent basis. As previously discussed lesser amounts may be used since water will react with the remaining isocyanate groups to chain extend the prepolymers. Also, undue excesses of the amine are not preferred because they may lead to products with undesirably low molecular weights. However, excesses may be used to provide additional cross-linking sites for the subsequent addition of cross-linkers, such as polyisocyanates or blocked polyisocyanates. For purposes of the above ratios a primary amino group is considered to have one amino hydrogen. For example, ethylene diamine has two equivalents of amino hydrogens and diethylene triamine has three equivalents.

The reaction between the isocyanate-terminated prepolymer and the polyamine is generally conducted at temperatures from about 5° to 90° C., preferably from about 20° to 80° C., and most preferably from about 30° to 60° C. The reaction conditions are normally maintained until the isocyanate groups are essentially completely reacted. The polyamines may be mixed with the dispersed prepolymer in its pure form or it may be dissolved or dispersed in water or an organic solvent. Suitable organic solvents are those previously described for use in preparing the isocyanate-terminated prepolymer.

The final product is a stable, aqueous dispersion of polyurethane-urea particles having a solids content of up to about 60% by weight, preferably about 15–60% by weight and most preferably about 30–45% by weight. However, it is always possible to dilute the dispersions to any minimum solids content desired. The particle size is generally below about 1.0 micron, and preferably between about 0.01 to 0.5 micron. The average particle size should be less than about 0.5 micron, and preferably between 0.01 to 0.3 micron. The small particle size enhances the stability of the dispersed particles and also leads to the production of films with high surface gloss.

Even when the polyurethane-urea dispersions of the subject application contain ionic groups they are largely unaffected by electrolytes if they also contain hydrophilic, ethylene oxide units. This provides, for example, for the acid-catalyzed cross-linking of the latex particles with formaldehyde derivatives; similarly they may be pigmented with electrolyte-active pigments or dyes. Another property of the dispersions according to the present invention is that they may be coagulated which makes them suitable for processing into films permeable to water vapor simply by heating.

The dispersions may be blended with other dispersions, for example, with polyvinyl acetate, epoxy resins, polyethylene, polystyrene, polybutadiene, polyvinyl chloride, polyacrylate and copolymer plastics dispersions. The addition of known, chemically nonfixed, ionic emulsifiers is also possible but not preferred. Fillers, plasticizers, pigments, carbon black, silica sols and the known levelling agents, wetting agents, antifoaming agents, stabilizers, etc., may also be incorporated into the dispersions.

The dispersions of the polyurethane-ureas in water are generally stable, storable and transportable and may be processed at a later stage, for example, by foaming. In general, they dry directly into dimensionally stable coatings, although formation of the end products may also be carried out in the presence of known cross-linking agents. Polyurethane-ureas having different properties may be obtained according to the chemical composition selected and to the urethane group content. Thus, it is possible to obtain soft, tacky compositions, and thermoplastic and elastomeric products having a variety of different hardnesses up to glass-hard duroplasts. The hydrophilicity of the products may also vary within certain limits. The elastomeric products may be thermoplastically processed at elevated temperatures, for example, at from about 100° to 180° C., providing they are not highly cross-linked.

The end products of the process are suitable for coating and impregnating woven and non-woven textiles, leather, paper, wood, metals, ceramics, stone, concrete, bitumen, hard fibers, straw, glass, porcelain, plastics of a variety of different types, glass fibers of antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

The dispersions may also be applied to a porous substrate which subsequently remains bonded to the end product, such as woven or nonwoven textile structures and fiber mats, felts or nonwovens, also paper webs, foam sheeting or split leather which by virtue of their absorbing action cause the coating to harden immediately. This is followed by drying and, optionally, pressing at elevated temperatures. However, drying may also be carried out on smooth, porous or nonporous materials, for example, metal, glass, paper, cardboard, ceramic materials, sheet steel, silicone rubber, aluminum foil, the end sheet structure subsequently being lifted off and used as such, or applied to a substrate using the reversal process by bonding, flame lamination or calendering. Application by the reversal process may be carried out at any time.

The properties of the end products may be modified by using vinyl polymers or active and inactive fillers. It is possible to use, for example, polyethylene, polypropylene, polyvinyl acetate, ethylene/vinyl acetate copolymers which may optionally be (partially) hydrolyzed and/or grafted with vinyl chloride, styrene-butadiene copolymers, ethylene (graft) copolymers, polyacrylates, carbon black, silica, asbestos, talcum, kaolin, titanium dioxide and glass in the form of powder or in the form of fibers or cellulose. Depending upon the required property spectrum and the application envisaged for the final product, up to about 70%, based on total dry substance, of these fillers may be present in the final product. Dyes or additives which influence flow properties may, of course, also be added.

Drying of the product obtained by various application techniques may be carried out either at room temperature or at elevated temperature. The drying temperature to be selected in each individual case, which is governed not only by the chemical compositions of the material, but above all by its moisture content, the drying time and the layer thickness, is readily determined by a preliminary test. For a given heating time, the drying temperature must always be below the solidification temperature.

Extremely hard polyurethane-ureas obtained from finely divided dispersions and sols are suitable for use as stoving lacquers and, in some cases, even as air-drying lacquers. They combine extreme hardness and elasticity with high gloss, favorable light stability and weather resistance.

These polyurethane dispersions are specifically suited for coatings on vinyl fabrics used in automotive seating and commercial upholstery. In these application areas, properties like plasticizer barrier effect, improved abrasion resistance and good hydrolytic and UV-resistance are of importance. They are also useful as coatings for textiles such as tarpaulins, specifically for military applications where properties like excellent toughness and retained properties after aging are essential.

Business machine housings which are made from plastic materials and where solvent borne coatings can attack the surface are another important application for these aqueous polyurethane-urea dispersions. Additionally, they are excellently suited to coat bowling alleys, as chip resistant coatings in automotive applications, for furniture, aircraft, foil and paper. They are also valuable as a co-binder for acrylic dispersions to improve properties like alcohol resistance, flexibility and appearance of resulting coatings.

The invention is further illustrated, but is not intended to be limited by the following examples in which all parts and percentages are by weight unless otherwise specified.

EXAMPLES

In the following examples a 0.5 liter dynamic mixer was used wherein the ratio of the length of the rotor to the internal diameter is about 0.7. The mixer contained five levels of pins, each level having 4 pins, was operated at a speed of 3500 rpms and was arranged horizontally, i.e. the rotor was horizontal. In all instances, the water and chain extender and, if present, the neutralizer and solvent were added at ambient temperature, i.e. 25°±2° C. The temperature in the first dynamic mixer can roughly be calculated by a mass balance on the components. In general, the temperature in the second dynamic mixer rose about 10°–15° C.

EXAMPLE 1

360 lbs. of a polyester based on hexane diol, neopentyl glycol and adipic acid (MW 1700, molar ratio of glycols 65:35), 8.1 lbs. of a polyethyleneoxidepolypropyleneoxide-polyether started on butanol (MW 2150, EO/PO molar ratio 83:17), 73.0 lbs. of a propoxylated adduct of 2-butenediol-(1,4) and sodium bisulphite (MW of the 70% solution in toluene 610), 46.9 lbs. of hexamethylene-1,6-diisocyanate, and 73.2 lbs. of bis- (4-isocyanatocyclohexyl)-methane were charged to a 100 gal. reactor and stirred for about 7 hours at 90°–100° C. The NCO-value found was 3.1%. 19.0 lbs. of 1-amino-3-aminomethyl-3,5,5-trimethylcyclohexane (IPDA), 3.3 lbs. diethylene triamine, and 106.7 lbs. demineralized water were mixed for chain extension. The prepolymer, isopropanol, demineralized water, and chain extender were pumped according to the previously described drawing with flow rates of:
Prepolymer: 750 g/min
Isopropanol: 70 g/min
Water: 970 g/min
Chain extender: 173 g/min
The prepolymer at a temperature of 92°–98° C. was initially mixed with isopropanol and then dispersed in water in the first dynamic mixer. Chain extension took place in the second dynamic mixer. The resulting product had a solids content of 40%, a pH of 6.8, and a viscosity at 25° C. of 95 mPa s. This dispersion is well suited as basecoat in textile coating application. The ultimate tensile strength of films made from this dispersion was about 3200 psi with an elongation of 480%. The hydrolytic stability of this polymer was excellent.

EXAMPLE 2

60 lbs. of a polybutylene adipate (MW 2000), 3.2 lbs. dimethylol propionic acid, 14.0 lbs. tolylene diisocyanate (80% of 2,4- and 20% of 2,6-isomer) and 10.0 lbs. N-methyl pyrrolidinone (NMP) were charged to a 100 gal. reactor. This mixture was stirred at 75° C. for about 4 hours. The NCO value was 2.28%. 2.3 lbs. triethylamine and 3.2 lbs. NMP were mixed as a neutralizer for the carboxylic acid groups. The chain extender was a 13.8% aqueous solution of 1-amino-3-aminomethyl-3,5,5-trimethylcyclohexane (IPDA). The prepolymer, neutralizer, demineralized water, and chain extender were pumped according to the previously described drawing in the following ratio:
Prepolymer: 723 g/min
Neutralizer: 43 g/min
Water: 665 g/min
Chain extender: 180 g/min
The prepolymer at a temperature of 86°–92° C. and neutralizer were mixed before they were dispersed with water in the first dynamic mixer. Chain extension took place in the second dynamic mixer. The resulting dispersion had a solids content of 41%, a viscosity at 25° C. of 45 mPa s, and a pH of 7.3. The resulting product is useful as an adhesive for plasticized PVC.

EXAMPLE 3

87.7 lbs. polybutylene adipate (MW 2000), 1.5 lbs. butanediol, 9.2 lbs. of a propoxylated adduct of 2-butenediol-1,4 and sodium bisulphite as in Example 1, 5.2 lbs. of polyethyleneoxide-polypropyleneoxide-polyether started on butanol as in Example 1, 45 lbs. of N-methyl pyrrolidinone, and 49.9 lbs. 4,4'-diisocyanato diphenyl methane were charged to a 100 gal. reactor and stirred for about 3 hours at 50°–60° C. The NCO-value was 4.8% and a small amount (0.11 lbs.) of p-toluene-sulfonic acid was used to slow down the reaction. 12.2 lbs. of 1-amino-3-aminomethyl-3,5-5-trimethylcyclohexane (IPDA) and 43.2 lbs. of demineralized water were mixed as the chain extender. Prepolymer, demineralized water and chain extender were pumped according to the previously described drawing at the following rates:
Prepolymer: 1000 g/min
Water: 810 g/min
Chain extender: 279 g/min
The prepolymer at a temperature of 58°–63° C. was dispersed in water in the first dynamic mixer. Chain extension took place in the second dynamic mixer. The resulting dispersion had a milky white appearance. The solids content was 39%, the viscosity at 25° C. was 90 mpa s, and the pH was 6.8.

EXAMPLE 4

194 lbs. of polypropylene oxide polyether (MW 1000), 15.8 lbs. of polyethylene oxide polypropylene oxide polyether started on butanol as in Example 1, 32.9 lbs. of a propoxylated adduct of 2-butenediol-1,4 and sodium bisulphite as in Example 1, 61.5 lbs. of 1-isocyanato-3-isocyanatomethyl-3,5,5-trimethylcyclohexane (IPDI), and 38.1 lbs. of hexamethylene-1,6-diisocyanate were charged to a 100 gal. reactor. This mixture was stirred for about 8 hours at 110° C. The NCO-value was 6.09%. 22.2 lbs. of 1-amino-3-aminomethyl-3,5,5-trimethylcyclohexane, 3.8 lbs. diethylenetriamine, and 60 lbs. demineralized water were mixed as chain extender. The prepolymer, demineralized water and chain extender were pumped according to the previously described drawing at the following rates:
Prepolymer: 1000 g/min
Water: 1372 g/min
Chain extender: 251 g/min
The prepolymer at a temperature of 62°–68° C. was dispersed in water in the first dynamic mixer. Chain extension took place in the second dynamic mixer. The resulting dispersion had a solids content of 39.5%, the viscosity was 200 mpa s at 25° C. and the pH was 7.0. The particle size of this dispersion was about 100 nm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A continuous process for the production of an aqueous polyurethane-urea dispersion which comprises
   (a) mixing an emulsifiable isocyanate-terminated prepolymer with an aqueous medium in a low shear, stator-rotor dynamic mixer operating at a speed of about 500 to 8000 rpm and having a mixing wattage of about 0.3 to 10 watts/cc and a mixing volume of at least about 0.1 liters, the average residence time of the aqueous medium and the prepolymer being about 1 to 30 seconds and the overall flow rate through the dynamic mixer being at least about 50 to 5000 kg/h, wherein said mixers, when arranged vertically, have levels of horizontal pins arranged in sets of at least one level of rotor pins and at least one level of stator pins such that the vertical spacing between said levels of pins is about 2 to 50 mm and
   (b) reacting the dispersed isocyanate-terminated prepolymer prepared in (a) with a polyamine chain extender to form an aqueous polyurethane-urea dispersion.

2. The process of claim 1 wherein step (b) is conducted in a second low shear, stator-rotor dynamic mixer operating at a speed of about 500 to 800 rpm and having a mixing wattage of about 0.3 to 10.0 watts/cc and a mixing volume of at least about 0.1 liters, the average residency time in said dynamic mixer being about 1 to 30 seconds and the overall flow rate through the dynamic mixer being at least about 50 to 5000 kg/h, wherein said mixer, when arranged vertically, has levels of horizontal pins arranged in sets of at least one level of rotor pins and at least one level of stator pins such that the vertical spacing between said levels of pins is about 2 to 50 mm.

3. The process of claim 1 wherein said dynamic mixer operates at a speed of about 2000 to 6000 rpm.

4. The process of claim 1 wherein said dynamic mixer has a mixing wattage of 0.5 to less than 5 watts/cc.

5. The process of claim 1 wherein said emulsifiable isocyanate-terminated prepolymer is prepared by a process which comprises reacting an excess of an aromatic diisocyanate with a dihydroxy compound having a molecular weight of 400 to about 6000.

6. A process for the continuous production of an aqueous polyurethane-urea dispersion which comprises
   (a) mixing an emulsifiable isocyanate-terminated prepolymer with an aqueous medium in a low shear, stator-rotor dynamic mixer and
   (b) reacting the dispersed isocyanate-terminated prepolymer prepared in (a) with a polyamine chain extender in a second low shear, stator-rotor dynamic mixer to form an aqueous polyurethane-urea dispersion, said dynamic mixer and said second dynamic mixer operating at a speed of about 2000 to 6000 rpm and having a mixing wattage of 0.5 to 5.0 watts/cc and a mixing volume of about 0.1 to 2.5 liters, the average residence time in the dynamic mixers being about 2 to 20 seconds and the overall flow rate through the dynamic mixers being about 60 to 2500 kg/h, wherein said mixers, when arranged vertically, have levels of horizontal pins arranged in sets of at least one level of rotor pins and at least one level of stator pins such that the vertical spacing between said levels of pins is about 2 to 50 mm.

7. The process of claim 6 wherein said emulsifiable isocyanate-terminated prepolymer is prepared by a process which comprises reacting an aromatic diisocyanate with a dihydroxy compound having a molecular weight of 400 to about 6000.

8. The process of claim 6 wherein said levels of mixing pins are vertically spaced about 3 to 25 mm apart.

9. The process of claim 6 wherein the vertical spacing between said sets of pins is about 2 to 50 mm.

10. The process of claim 6 wherein the vertical spacing between said levels and said sets is about 3 to 25 mm.

* * * * *